(12) United States Patent  (10) Patent No.: US 6,563,061 B2
Takahashi  (45) Date of Patent: May 13, 2003

(54) KEY SWITCH AND KEYBOARD

(75) Inventor: Kimiyo Takahashi, Iiyama (JP)

(73) Assignee: Fujitsu Takamisawa Component Limited, Tokyo (JP)

(*) Notice: Subject to any disclaimer, the term of this patent is extended or adjusted under 35 U.S.C. 154(b) by 0 days.

(21) Appl. No.: 09/842,893

(22) Filed: Apr. 27, 2001

(65) Prior Publication Data
US 2001/0035333 A1 Nov. 1, 2001

(30) Foreign Application Priority Data
Apr. 28, 2000 (JP) ........................................ 2000-134333

(51) Int. Cl.⁷ ................................................ H01H 9/26
(52) U.S. Cl. ........................................ 200/5 A; 200/343
(58) Field of Search ................................ 200/5 A, 341, 200/343, 345, 512, 516, 520, 553, 517; 361/680; 400/472–496

(56) References Cited

U.S. PATENT DOCUMENTS 3,965,319 A * 6/1976 Lockard ..................... 345/102
5,360,955 A * 11/1994 English et al. .............. 200/343
5,714,732 A * 2/1998 Lee ............................ 345/168
6,325,346 B1 * 12/2001 Chang et al. ........... 248/225.11
6,373,689 B1 * 4/2002 Yim ............................ 361/680

FOREIGN PATENT DOCUMENTS

JP    11-282608    10/1998

* cited by examiner

Primary Examiner—Elvin Enad
Assistant Examiner—Lisa N Klaus
(74) Attorney, Agent, or Firm—Staas & Halsey LLP

(57) ABSTRACT

A key switch including a plurality of key tops coupled with each other in an independently movable manner and a switching mechanism arranged close to the key tops and including plural sets of electric contacts. The switching mechanism is capable of opening and closing any one of the plural sets of electric contacts in connection with individual movements of the key tops. A keyboard having a plurality of key switches includes a casing for accommodating the key switches with the key tops thereof being at least partially exposed, and a connecting section joined to the casing and capable of electrically connecting the key switches with a portable information apparatus. The casing is capable of detachably supporting the portable information apparatus through the connecting section.

24 Claims, 8 Drawing Sheets

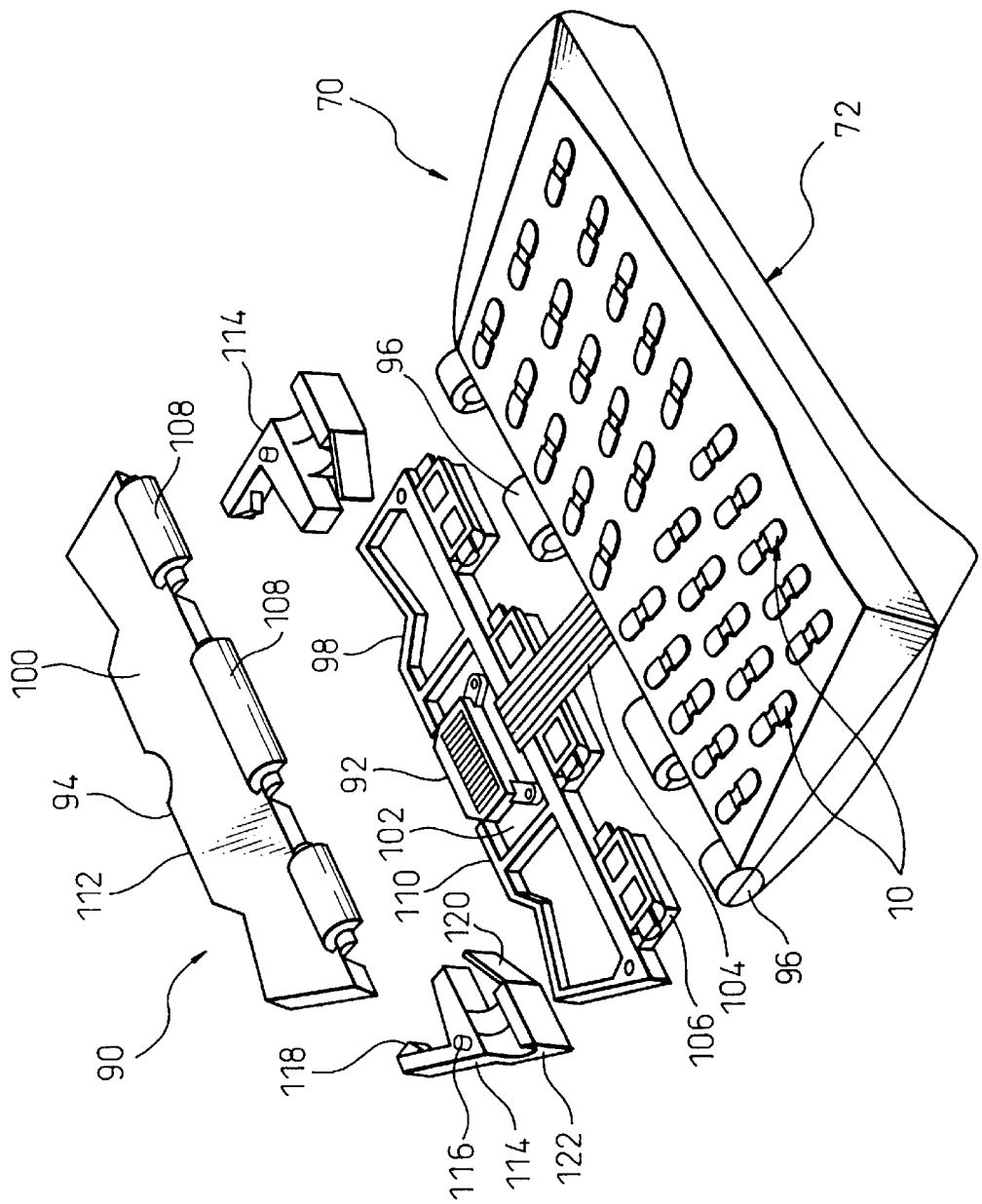

KEY SWITCH AND KEYBOARD

BACKGROUND OF THE INVENTION

1. Field of the Invention

The present invention relates, generally, to an electrical switch arrangement and, more particularly, to a key switch used in a keyboard as an input device for electronic equipment and including a key top adapted to be pressed for operation. The present invention also relates to a keyboard provided with a plurality of key switches and capable of being detachably connected to a portable electronic information apparatus.

2. Description of the Related Art

In the technical field of portable electronic information apparatus, such as electronic notebooks, personal digital assistants (PDAs), etc., it has been known that a keyboard as an input device is not incorporated in the apparatus but instead a data entry operation is performed by touching and/or handwriting on a display screen of the apparatus with a operator's finger and/or a pen. When an operator enters data including, in particular, a large quantity of information such as letters or sentences, into this pen-entry type portable information apparatus, an entering operation may take more time than that in a keyboard-entry type information apparatus if the operator lacks skill in pen-entry operation. To cope with such an inconvenience, a pen-entry type portable information apparatus capable of using an exclusive small-sized keyboard optionally and detachably connected to the apparatus has been developed.

As a small-sized keyboard usable for and connectable to a pen-entry type portable information apparatus, there is provided an independent keyboard having a structure similar to a typical keyboard incorporated in a portable electronic apparatus, such as a notebook-sized personal computer, in which the number and arrangement of keys (or key tops of key switches) are not substantially changed from those in the typical keyboard. In this type of small-sized keyboard, it is required that the dimension and pitch of the keys are reduced to such an extent that the operation property of a large number of keys can be maintained at a desired level. Therefore, the keyboard has in itself less portability, from the viewpoint of size and weight, than that of the portable information apparatus. Also, this small-sized keyboard is usually connected with the portable information apparatus through an electric cable having a connector, so that it is difficult for an operator to operate the keyboard in a hand-held manner under the condition that the keyboard is connected with the portable information apparatus through the cable. Accordingly, to ensure an accurate and smooth entering operation, it is preferred that the operator put the keyboard on a desk or his knees for operation.

On the other hand, as disclosed in Japanese Unexamined Patent Publication (Kokai) No. 11-282608, there is proposed a small-sized keyboard which is further miniaturized by decreasing the number of keys to fewer than that of a typical keyboard incorporated in a portable electronic apparatus, such as a notebook-sized personal computer, and which can be connected with a portable information apparatus through a connecting section mechanically joined to a keyboard casing, without using the electric cable having a connector. Since the number of keys is decreased in this type of small-sized keyboard, it is possible to provide a miniaturized light-weight keyboard having a superior portability and capable of being easily put on a single hand of an operator, without excessively reducing the dimension and pitch of the keys. Also, in this small-sized keyboard, it is possible to support the portable information apparatus on the keyboard casing through the connecting section, which results in an advantage that the operator can perform an entry operation on the keyboard in a hand-held manner while holding the keyboard together with the portable information apparatus with a single hand.

The above conventional small-sized keyboard, capable of being operated in the hand-held manner, can exhibit a very superior performance in portability and operability thereof, especially when the keyboard is used as a peripheral device optionally connected with a pen-entry type portable information apparatus. However, since the number of keys is decreased in this keyboard, an operation procedure for entering letters or characters is inevitably different from an entry operation procedure in a typical keyboard incorporated in a portable electronic apparatus such as a notebook-sized personal computer. Accordingly, in the small-sized keyboard having a superior portability, which can be reduced in size and weight to such an extent as to enable a hand-held operation of the keyboard during a condition connected with a portable information apparatus, it has been required to provide the keyboard with keys or key tops having the number and arrangement for permitting the entry operation of letters or characters to be performed by substantially the same procedure as that of a typical keyboard. Also, it is desired to develop a miniaturized key switch having a good operability, which can be incorporated in the above-described keyboard having a superior portability.

SUMMARY OF THE INVENTION

It is therefore an object of the present invention to provide a key switch having a key top to be pressed for operation, which can effectively reduce a space for installing a key top therein without impairing the operation property of the key top.

It is another object of the present invention to provide a keyboard including a plurality of key switches, which can be provided with keys or key tops having the number and arrangement for permitting the entry operation of letters or characters to be performed by substantially the same procedure as that of a typical keyboard, and which allows reduction in the size and weight of the keyboard without impairing the operation of the key tops of the respective key switches.

It is still another object of the present invention to provide a keyboard including a plurality of key switches, which can be provided with keys or key tops having the number and arrangement for permitting the entry operation of letters or characters to be performed by substantially the same procedure as that of a typical keyboard, and which can be operated in a hand-held manner under a condition that the keyboard is connected with a portable information apparatus.

In accordance with the present invention, there is provided a key switch comprising a plurality of key tops coupled with each other in an independently movable manner; and a switching mechanism arranged close to the plurality of key tops and including plural sets of electric contacts, the switching mechanism capable of opening and closing any one of the plural sets of electric contacts in connection with individual movements of the key tops.

In this arrangement, the plurality of key tops may be mutually coupled through an axle so as to be rotatable relative to each other.

It is preferred that the plurality of key tops is provided in a mutual coupling region thereof with a supporting section for supporting the mutual coupling region against an external force.

It is advantageous that the plurality of key tops is provided in a mutual coupling region thereof with a protrusion protruding outward from the key switch.

The switching mechanism may include a plurality of electrically conductive spring members for individually and elastically supporting the plurality of key tops, each of the electrically conductive spring members being elastically deformed in accordance with a pressing operation of each key top so as to close one of the plural sets of electric contacts.

The present invention also provides a keyboard comprising a plurality of key switches, each of the key switches being as defined above.

The keyboard may further comprise a casing for accommodating the plurality of key switches with the plurality of key tops being at least partially exposed, and a connecting section joined to the casing and capable of electrically connecting the plurality of key switches with a portable information apparatus, wherein the casing is capable of detachably supporting the portable information apparatus through the connecting section.

It is preferred that the casing include a pair of grip sections, each grip section being usable for single-hand grasping.

It is advantageous that the grip sections are arranged at opposite end regions of the casing, that the plurality of key switches is accommodated in the casing so as to dispose the plurality of key tops of the key switches in an array between the grip sections, and that the key tops of each key switch are arranged adjacent to each other about a mutual coupling region thereof, in such a manner as to present either one of two different orientations defined in opposite areas of a virtual bisector located at a substantial center between the grip sections on the casing.

In this arrangement, the key tops of the plurality of key switches may be disposed in a substantially symmetrical array with respect to the virtual bisector on the casing.

The present invention further provides a keyboard comprising a casing including a pair of grip sections, each grip section being usable for a single hand grasping; and a plurality of key switches accommodated in the casing, each of the key switches including a plurality of key tops which are coupled with each other in an independently movable manner and are at least partially exposed from the casing, and a switching mechanism arranged close to the plurality of key tops in the casing and including plural sets of electric contacts, the switching mechanism capable of opening and closing any one of the plural sets of electric contacts in connection with individual movements of the key tops; wherein the plurality of key tops of each key switch is arranged adjacent to each other about a mutual coupling region thereof, at positions allowing a finger operation by a hand grasping one of the grip, sections.

BRIEF DESCRIPTION OF THE DRAWINGS

The above and other objects, features and advantages of the present invention will become more apparent from the following description of preferred embodiments in connection with the accompanying drawings, in which:

FIG. 10 is an exploded perspective view showing a connecting section of a keyboard according to a preferred embodiment of the present invention.

DESCRIPTION OF THE PREFERRED EMBODIMENT

Figure 1:
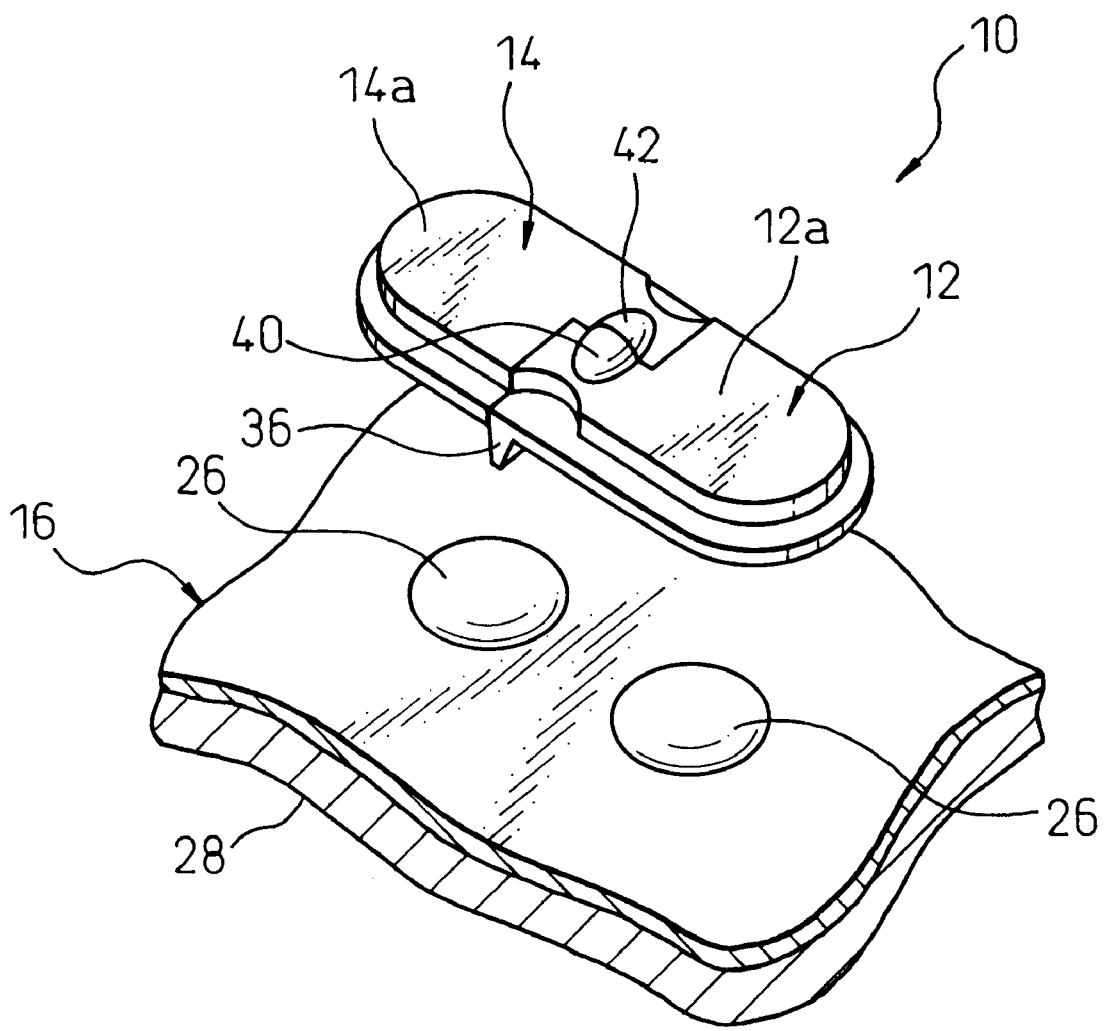
FIG. 1 is an exploded perspective view showing a key switch according to a first embodiment of the present invention.
Figure 2:
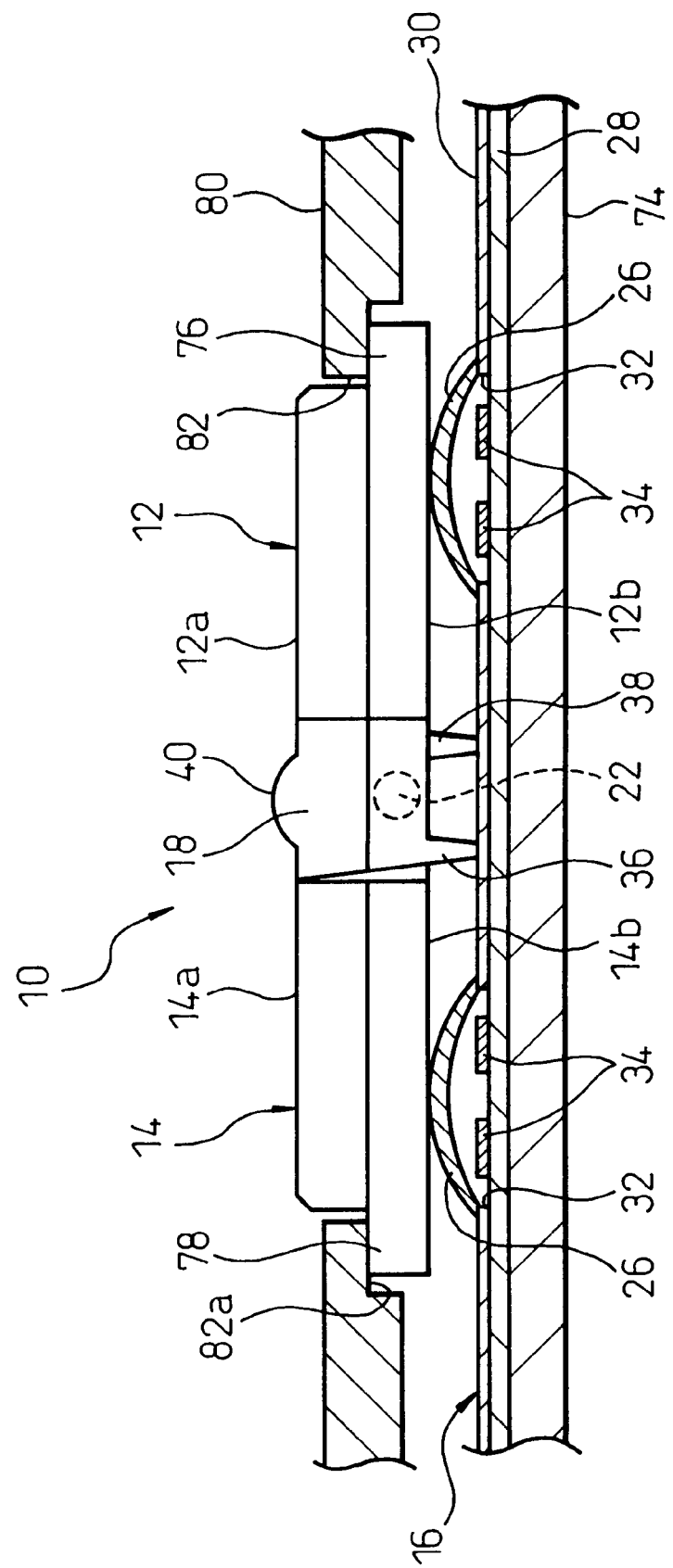
FIG. 2 is a sectional view of the key switch of FIG. 1 in an assembled state.
Figure 3:
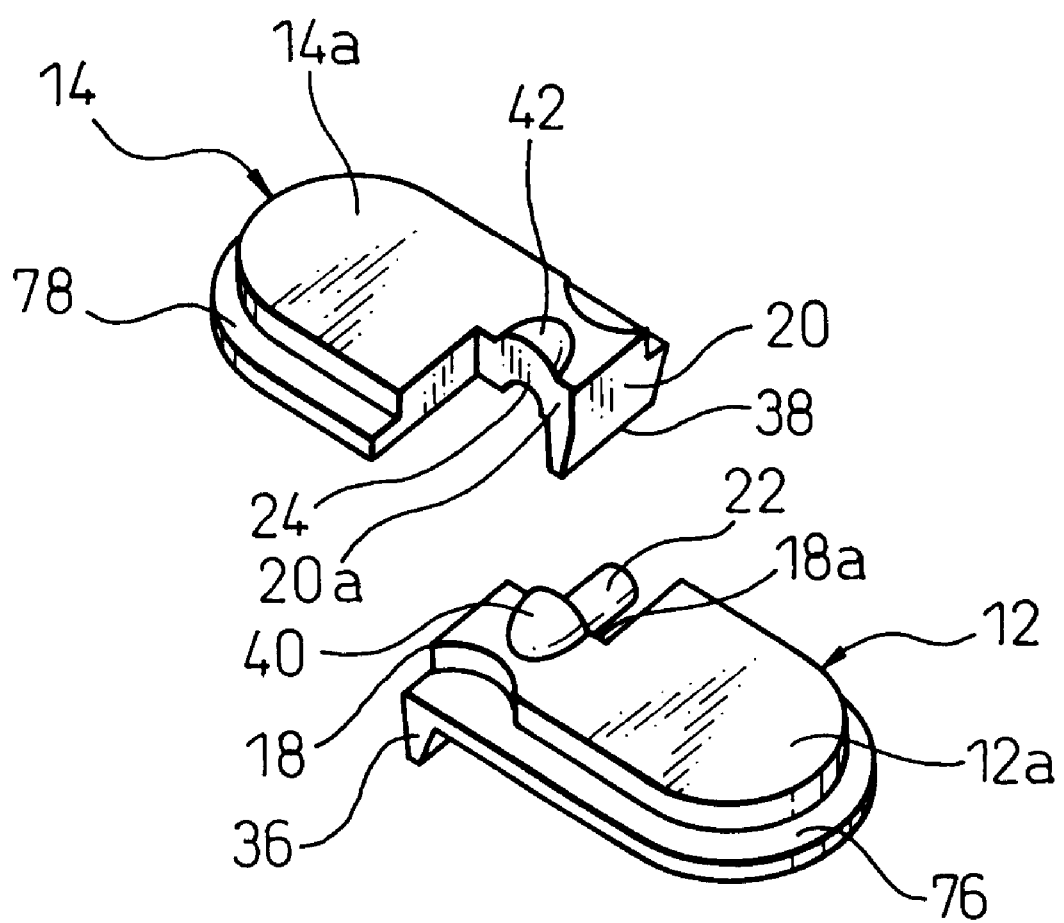
FIG. 3 is an exploded perspective view of a pair of key tops in the key switch of FIG. 1.

Referring now to the drawings, in which the same or similar components are denoted by common reference numerals, FIG. 1 is an exploded perspective view showing a key switch 10 according to one embodiment of the present invention, FIG. 2 is a sectional view of the key switch 10 shown in an assembled state, and FIG. 3 is an exploded perspective view of a pair of key tops 12, 14 in the key switch 10. The key switch 10 includes a pair of key tops 12, 14 mutually coupled in an independently movable or operable manner, and a switching mechanism 16 arranged close to the key tops 12, 14 and capable of opening and closing different electric contacts of an electric circuit in accordance with the individual vertical movements of the key tops 12, 14.

The key tops 12, 14 are respectively provided with operation surfaces 12a, 14a for receiving a pressing force applied by an operator. The operation surfaces 12a, 14a have substantially the same dimensions and profiles, and are combined with each other so as to present a substantially elliptical shape in a plan view when the key tops 12, 14 are coupled with each other. Each of the key tops 12, 14 is provided with a generally U-shaped outer peripheral edge of each operation surface 12a, 14a including an arcuate edge part, and an extending portion 18, 20 located opposite to the arcuate edge part and extending in a major-axis direction of the elliptical shape to define a substantially rectangular shape in a plan view. The extending portions 18, 20 come into substantial contact with each other on the respective lateral faces 18a, 20a thereof extending in the major-axis direction, and are combined with each other in a complementary manner, so as to constitute a mutual coupling region of the key tops 12, 14.

As shown in FIG. 3, the extending portion 18 of one key top 12 is provided with a cylindrical axle 22 projecting from the lateral face 18a and extending in a minor-axis direction of the elliptical shape. The extending portion 20 of the other key top 14 is provided on the bottom face thereof with a bearing groove 24 defining an arcuate sectional shape and extending in the minor-axis direction of the elliptical shape so as to slidably receive the axle 22. When the axle 22 is engaged with the bearing groove 24, the key tops 12, 14 are mutually coupled in a manner rotatable or pivotable about the axle 22 relative to each other.

The switching mechanism 16 includes a pair of electrically conductive spring members 26 located respectively beneath the key tops 12, 14 for individually and elastically supporting the key tops 12, 14, and a circuit board 28 arranged under the conductive spring members 26 for securely carrying the spring members 26 thereon. Each of the spring members 26 is formed from a dome-shaped metal piece capable of exhibiting a spring property when it is elastically deformed. Each spring member 26 is arranged between each key top 12, 14 and the circuit board 28 with a dome top thereof being directed to the corresponding key top 12, 14. Each spring member 26 is slidably abutted on the outer face of the dome top thereof to the reverse surface 12b, 14b of the corresponding key top 12, 14. Also, each spring member 26 is fixed at the bottom edge thereof to an electrically insulating sheet 30, and the sheet 30 is securely laid over the upper face of the circuit board 28. The sheet 30 is provided with circular openings 32 penetrating through the sheet 30 at positions corresponding to the respective spring members 26.

The circuit board 28 is provided on the upper face thereof with two sets of contacts 34 patterned thereon as parts of an electric circuit (not shown). A pair of contacts 34 of each set is spaced from each other and positioned inside each opening 32 formed in the sheet 30 so as to be arranged beneath the spring member 26. The spring member 26 is elastically deformed in accordance with the pivot motion of the corresponding key top 12, 14, so as to open or close the pair of contacts 34 (or the contact pair 34).

When no pressing force is applied to, e.g., the operation surface 12a of the key top 12, the spring member 26 located beneath the key top 12 urgingly supports, on the outer face of the dome top thereof, the key top 12 in the uppermost or initial position of an key-entry stroke, which is spaced vertically upward from the circuit board 28. When an operator presses down the key top 12 for a data-entry operation, the spring member 26 is deformed while exerting an elastic biasing force on the key top 12 in an upward direction. When the key top 12 reaches the lowermost position of the key-entry stroke, the spring member 26 comes, on the inner face of the dome top thereof, into contact with the pair of contacts 34, so as to close the contact pair 34. When the pressing force to the key top 12 is released, the spring member 26 is elastically restored and the dome top thereof is thus separated from the contacts 34, so as to open the contact pair 34 and to move the key top 12 back to the initial position.

Also, in the key top 14, when a pressing force is applied to or released from the operation surface 14a, the spring member 26 located beneath the key top 14 acts in the same manner as in the key top 12, so as to open or close the other contact pair 34. In this connection, the opening/closing motion of each key top 12, 14 is a independent pivot motion about the axle 22, which can be performed independently from the counterpart key top 12 or 14.

In the above structure, to ensure the smooth pivot motion of each key top 12, 14 about the axle 22 when a pressing force is applied to the operation surface 12a, 14a for an entry operation, it is necessary to securely hold the axle 22 at a predetermined position while resisting the pressing force. To this end, the key tops 12, 14 are respectively provided with supporting elements or legs 36, 38 formed on the distal ends of the extending portions 18, 20 so as to extend downward therefrom and adjacent to the axle 22 and the bearing groove 24, respectively. The legs 36, 38 are slidably abutted at the distal ends thereof to the sheet 30 laid on the circuit board 28, and thereby the axle 22 as well as the mutual coupling region of the key tops 12, 14 are held and supported at a predetermined position above the circuit board 28 against the pressing force for operation.

As described above, the key tops 12, 14 coupled together are arranged in such a manner that the operation surfaces 12a, 14a thereof are adjacent to each other with the mutual coupling region being located therebetween. Therefore, at a time when an operator applies a pressing force to the operation surface 12a, 14a of either one of key tops 12, 14 by, e.g., his finger, it is advantageous that the operator can recognize by touching a boundary area between the operation surfaces 12a, 14a. To this end, the key tops 12, 14 are provided respectively on the top faces of the extending portions 18, 20 with protrusions 40, 42 protruding upward therefrom. When the key tops 12, 14 are coupled with each other, the protrusions 40, 42 are combined with each other so as to create a substantially elliptical ridge bulging upward in the boundary area between the operation surfaces 12a, 14a. Thus, the operator can recognize the boundary area between the operation surfaces 12a, 14a by touching the protrusions 40, 42 with his finger just before pressing either one of key top 12, 14 for an entry operation.

Figure 4A:
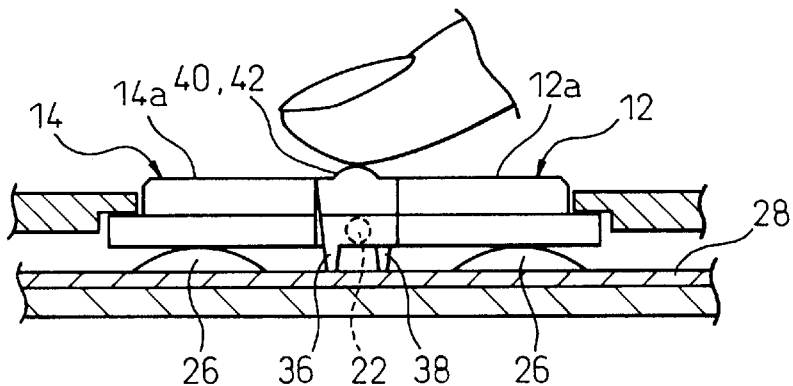
FIGS. 4A to 4C are illustrations for showing an example of operating steps in the key switch of FIG. 1.
Figure 4B:
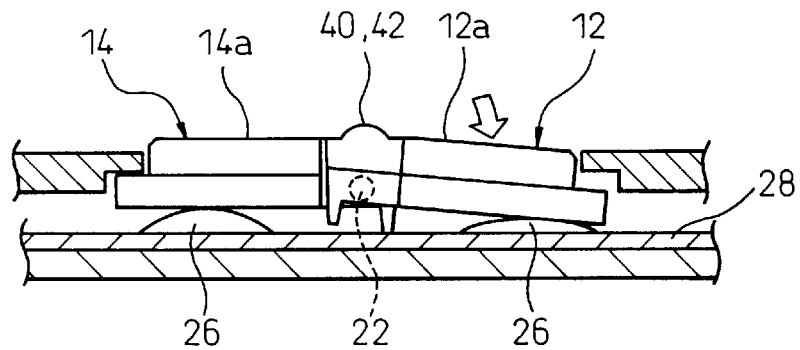

An example of a procedure for operating the key switch 10 having the above constitution will be explained below with reference to FIG. 4.

First, an operator puts his desired finger on the combined protrusions 40, 42 of the key tops 12, 14 of the key switch 10 (FIG. 4A), to recognize, by his tactile perception, the boundary area between the operation surfaces 12a, 14a. At this time, the mutual coupling region of the key tops 12, 14, containing the protrusions 40, 42, is securely held and supported in a predetermined position above the circuit board 28 by the respective legs 36, 38. From this initial condition or a home position of the finger, if the operator wishes to press, e.g., the key top 12, the operator can slidingly move his finger onto the operation surface 12a with the finger being maintained in contact with the key top 12, and then he applies a pressing force to the operation surface 12a. Consequently, the key top 12 rotates downward about the axle 22 while resisting an elastic biasing force caused by the deformation of the corresponding spring member 26, and reaches the lowermost position of the key-entry stroke (FIG. 4B) to close the contact pair 34 (FIG. 2). Thereafter, when the operator moves his finger upward to separate it from the operation surface 12a of the key top 12, the contact pair 34 can be opened.

Figure 4C:
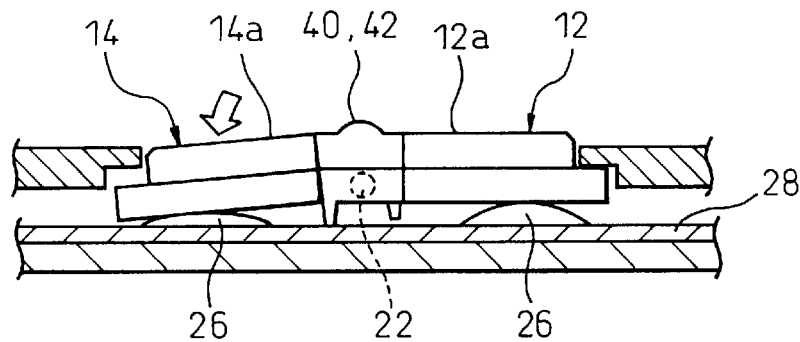

After the contact pair 34 corresponding to the key top 12 is closed, the operator also can slidingly move his finger back to the home position on the protrusions 40, 42, instead of moving the finger upward to separate it from the operation surface 12a. Due to this operation, if the operator wishes to successively press the key top 14, he can immediately move his finger in a sliding manner onto the operation surface 14a, and then apply a pressing force to the key top 14 for operation (FIG. 4C).

According to the key switch 10 having the above-described arrangement, wherein the key tops 12, 14 are mutually coupled in an independently operable manner and the key tops 12, 14 are individually operated to open or close the different contact pairs 34, it is possible to effectively reduce a space required for installing the key tops 12, 14 while ensuring a switching function equivalent to that of two separated conventional key switches arranged adjacent to each other. Also, the axle 22 for coupling the key tops 12, 14 together while allowing the relative pivot motion thereof can simplify the coupling structure of the key tops 12, 14 and also can reduce the dimensions of the key tops 12, 14.

Furthermore, the legs 36, 38 formed in the mutual coupling region of the key tops 12, 14 for supporting the mutual coupling region while resisting a pressing force can make it possible for the operator to easily and correctly press either one of the key tops 12, 14 with his single finger and to prevent the key tops 12, 14 from being pressed simultaneously. Moreover, the protrusions 40, 42 formed in the mutual coupling region of the key tops 12, 14 to protrude outward from the key switch 10 make it possible for the operator to easily recognize with his finger the boundary area between the operation surfaces 12a, 14a. Thus, the home position is established by the combined protrusions 40, 42 between the key tops 12, 14 (or two switches in function), so that each key top 12, 14 can be accurately operated by a touch typing operation.

Figure 5:
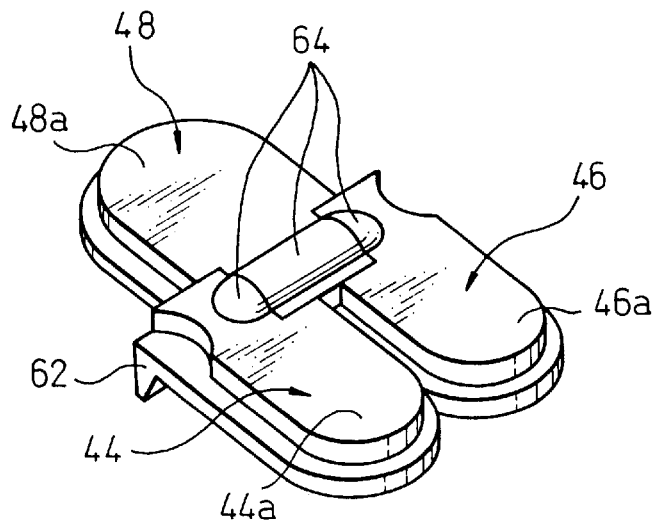
FIG. 5 is a perspective view showing three key tops in an assembled state, adapted to be used in a key switch according to another embodiment of the present invention.
Figure 6:
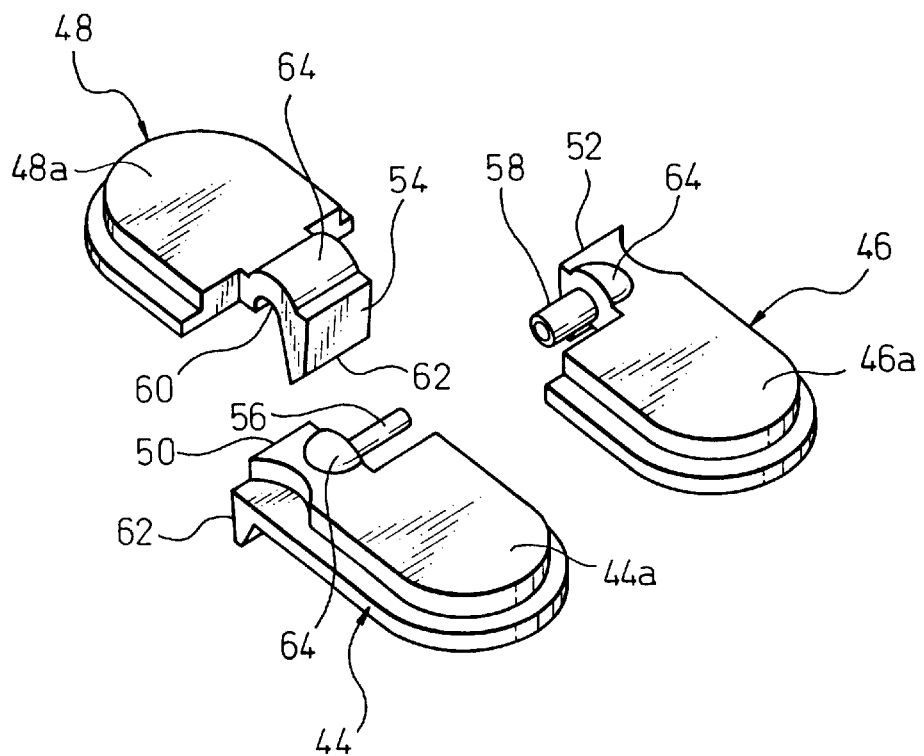
FIG. 6 is an exploded perspective view of the three key tops of FIG. 5.

It will be appreciated that the key switch according to the present invention is not limited to the above embodiment and various modifications thereof may be made. For example, the key switch can include at least three key tops coupled with one another in an independently operable manner and the switching mechanism having at least three pairs of contacts individually openable and closable in accordance with the individual movement of the key tops. FIGS. 5 and 6 show an exemplary structure in which three key tops 44, 46, 48 are coupled with one another in an independently operable manner. These key tops 44, 46, 48 can be assembled with a switching mechanism (not shown) having a structure similar to the switching mechanism 16 of the key switch 10 except for the number of contact pairs, and thus can constitute a modified embodiment of the present invention.

In the embodiment shown in FIGS. 5 and 6, each of the key tops 44, 46, 48 has a structure similar to that of each key top 12, 14 as described. That is, the key tops 44, 46, 48 are mutually coupled in such a manner as to be pivotable about one axle relative to one another, two key tops 44, 46 being arranged side-by-side with each other in one side of a pivot axis and one key top 48 being arranged in the other side of the pivot axis along a line extending from a boundary between the key tops 44, 46. The key tops 44, 46, 48 are respectively provided with operation surfaces 44a, 46a, 48a for receiving a pressing force applied by an operator. The operation surfaces 44a, 46a, 48a have substantially the same dimensions and profiles, each profile being substantially a semi-elliptical shape.

The key tops 44, 46, 48 also include extending portions 50, 52, 54, respectively, which are combined with each other in a complementary manner, so as to constitute a mutual coupling region of the key tops 44, 46, 48. The extending portion 50 of one key top 44 of the side-by-side pair is provided with a cylindrical axle 56 projecting from the lateral face of the extending portion 50 and extending in the minor-axis direction of the semi-elliptical shape. The extending portion 52 of another key top 46 of the side-by-side pair is provided with a hollow cylindrical sleeve 58 projecting from the lateral face of the extending portion 52 and extending in the minor-axis direction of the semi-elliptical shape so as to slidably accommodate the axle 56. The extending portion 54 of the other key top 48 is provided on the bottom face thereof with a bearing groove 60 defining an arcuate sectional shape and extending in the minor-axis direction of the semi-elliptical shape so as to slidably receive the sleeve 58. Also, each key top 44, 46, 48 is provided in the mutual coupling region with a leg 62 for supporting the mutual coupling region in place against an external pressing force and a protrusion 64 protruding outside the key switch for allowing tactile recognition by an operator.

The not-shown switching mechanism provided for the key tops 44, 46, 48 may include three electrically conductive spring members (similar to the spring members 26) for individually and elastically supporting the key tops 44, 46, 48, and three contact pairs (similar to the contact pairs 34) formed on a circuit board (similar to the circuit board 28) at positions corresponding to the spring members. It will be understood that the key switch having this structure can provide various effects equivalent to those of the key switch 10 as described.

The above-described key tops 12, 14, 44, 46, 48 may be integrally formed or molded of suitable resinous materials. Also, instead of the switching mechanism 16 including the spring members 26 and the contact pairs 34 on the circuit board 28, another type of switching mechanism may be adopted, which includes a sheet switch (also referred to as a membrane switch) formed by laminating a pair of flexible circuit boards respectively carrying contacts, and elastic actuating members disposed between the key tops and the membrane switch so as to act to close the corresponding contact pairs in accordance with the pressing operation of the key tops.

Figure 7:
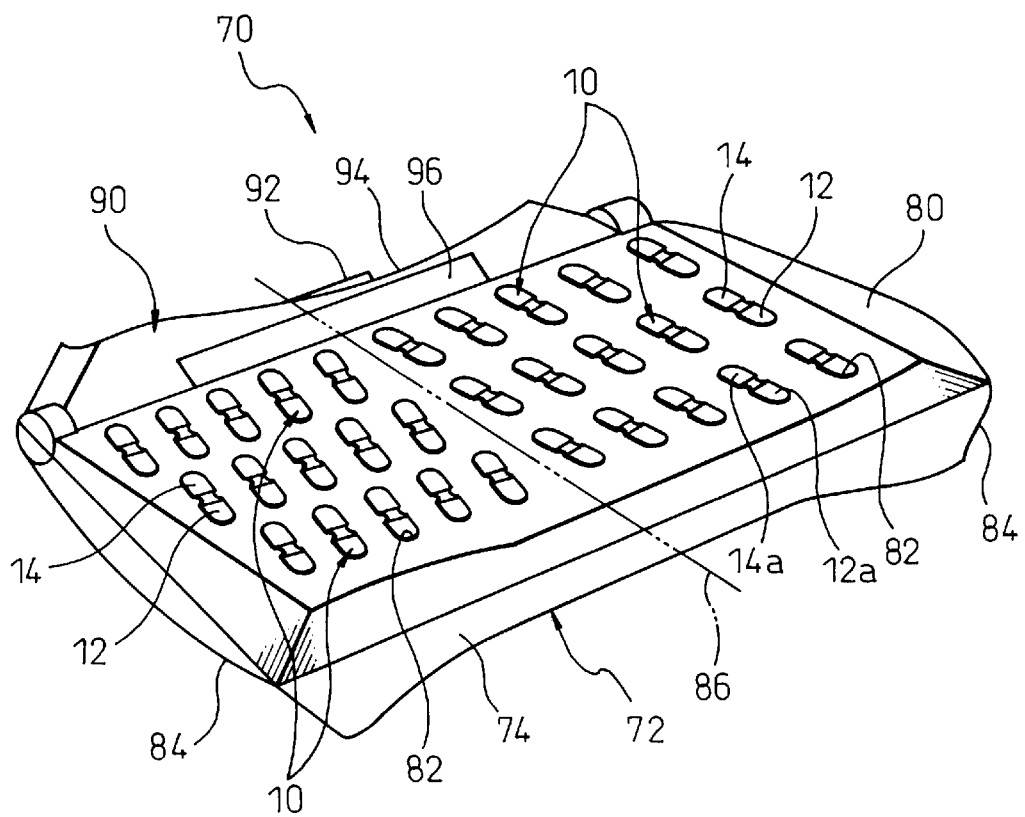
FIG. 7 is a perspective view showing a keyboard according to one embodiment of the present invention.

FIG. 7 shows a keyboard 70 according to an embodiment of the present invention, which includes a plurality of key switches 10 as described. The keyboard 70 includes a casing 72 for accommodating a plurality (thirty, in the drawing) of key switches 10 disposed in a predetermined array with at least the operation surfaces 12a, 14a of the key tops 12, 14 of the respective key switches 10 being exposed from the casing 72. That is, the keyboard 70 is provided in the top surface of the casing 72 with a desired array of sixty key tops 12, 14 capable of being operated independently from each other. The coupled key tops 12, 14 of all the key switches 10 have dimensions and profiles substantially the same as one another in a mutually coupled state.

In the keyboard 70, the circuit board 28 and the sheet 30 provided in each key switch 10 are formed as a large circuit board and a large sheet, which are commonly used for all the key switches 10 incorporated in the keyboard 70, and the large circuit board is securely supported on a lower plate member 74 of the casing 72 (see FIG. 2). The key tops 12, 14 of each key switch 10 respectively have the reverse surfaces 12b, 14b slightly larger than the operation surfaces 12a, 14a, so that flange portions 76, 78 extending outward are formed along the outer peripheral edges of the operation surfaces 12a, 14a. The flange portions 76, 78 of the key tops 12, 14 can be engaged at the top shoulder faces thereof with an upper plate member 80 of the casing 72 of the keyboard 70, so as to stop the key tops 12, 14 at the uppermost position of the key-entry stroke (see FIG. 2).

The upper plate member 80 of the casing 72 is provided with a plurality (thirty, in the drawing) of generally elliptical through-holes 82 for individually exposing the operation surfaces 12a, 14a of the key tops 12, 14 of the key switches 10 to the exterior of the upper plate member 80 when the key tops 12, 14 are located at the uppermost position of the key-entry stroke. Each through-hole 82 is provided with a stepped circumferential edge 82a (see FIG. 2) adapted to be engaged with the flange portion 76, 78 of each key top 12, 14, whereby the operation surface 12a, 14a of each key top 12, 14 can be located slightly above the top surface of the upper plate member 80. In this connection, it is advantageous that, during the time when each key top 12, 14 is stopped at the uppermost position of the key-entry stroke by the engagement of the flange portion 76, 78 with the upper plate member 80 of the casing 72, the spring member 26 is slightly deformed so as to generate a preliminary elastic recovering force. Due to this arrangement, it is possible to prevent the key tops 12, 14 from chattering during a non-operating condition.

Figure 8:
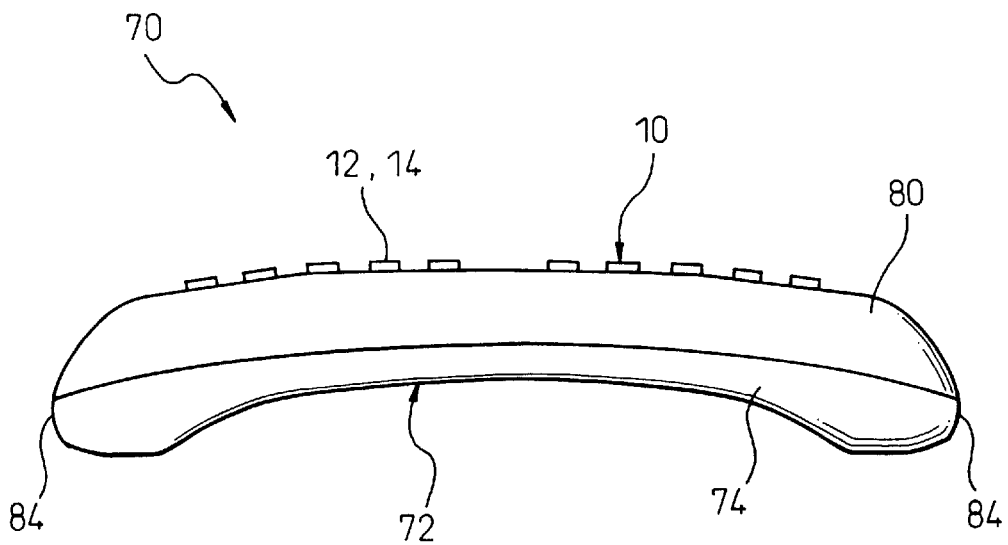
FIG. 8 is a schematic front view of the keyboard of FIG. 7.

The casing 72 is provided at opposed end regions with grip sections 84, each of which can be grasped by an operator with a single hand. As shown in FIG. 8, each grip section 84 has a convexly curved profile defined by the lateral end region of the lower plate member 74 of the casing 72, which bulgingly extends downward and is smoothly joined with the corresponding lateral end region of the upper plate member 80 with no substantial step formed therebetween. A plurality of key switches 10 is housed in the casing 72 while the pairs of key tops 12, 14 thereof are disposed in an array between the grip sections 84. In this respect, the key tops 12, 14 of each key switch 10 are arranged oppositely to each other about the mutual coupling region thereof and located at positions for permitting the key tops 12, 14 to be operated with the finger of the operators hand holding one grip section 84.

More specifically, the key tops 12, 14 of each key switch 10 are arranged adjacent to each other about the mutual coupling region thereof, in such a manner as to present either one of two different orientations defined in opposite areas of a virtual bisector 86 located at a substantial center of the upper plate member 80 of the casing 72 between the grip sections 84. That is, a plurality (fifteen, in the drawing) of key switches 10 occupying the left area, as illustrated, of the virtual bisector 86 between the grip sections 84 is arranged to present one orientation wherein the key tops 12, 14 of each key switch 10 are positioned along an inclined line having a rising right end as seen in a top plan view of the casing 72. Also, a plurality (fifteen, in the drawing) of key switches 10 occupying the right area, as illustrated, of the virtual bisector 86 between the grip sections 84 is arranged to present the other orientation wherein the key tops 12, 14 of each key switch 10 are positioned along an inclined line having a rising left end as seen in a top plan view of the casing 72.

Due to the above configuration of the array of the key tops 12, 14, when an operator grasps either one of the grip sections 84 by a single hand with the thumb thereof directed upward, the operator can easily operate any one of the plural (fifteen) key switches 10 occupying one of opposite areas of the virtual bisector 86, near the grasped grip sections 84, by pressing the key top 12 or 14 with the thumb of that hand. Especially, to enable the operator to enter data with his thumb without visually recognizing the objective key tops 12, 14, i.e., by a touch-typing operation, it is further advantageous that the key tops 12, 14 of the key switches 10 are arranged substantially symmetrically with respect to the virtual bisector 86 between the grip sections 84 of the casing 72. However, it should be appreciated that the keyboard of the present invention does not restrict the methods of data-entry operation of the key switches incorporated therein, and therefore, the key switches 10 disposed in the above-described array can be subjected to any data-entry operations performed in various ways other than the operation using a thumb as described, such as a key-entry operation commonly performed for a conventional keyboard, wherein the plural fingers of both hands are used. Furthermore, it is possible to dispose the plurality of key switches 10 in the casing 72 in various arrays other than the above-described array.

Figure 9:
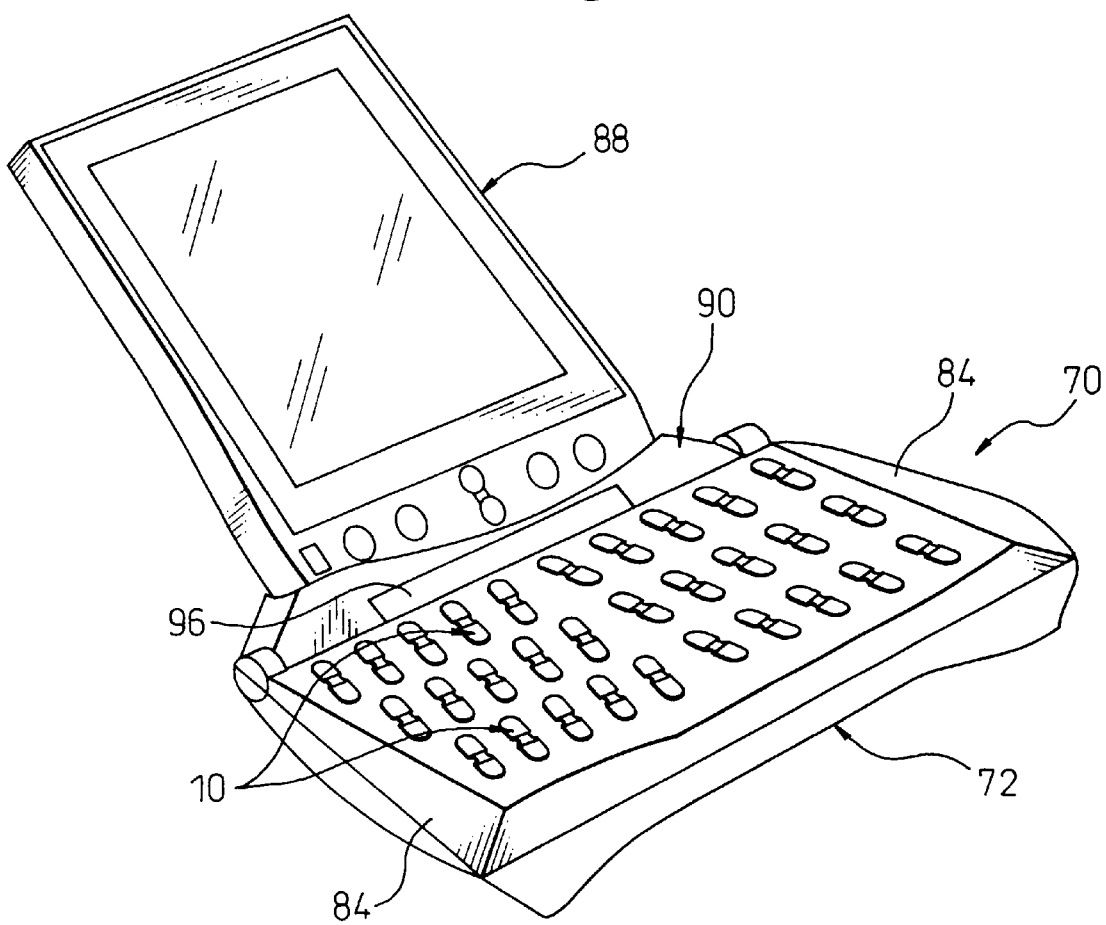
FIG. 9 is a perspective view showing the keyboard of FIG. 7 connected with a portable information apparatus.

The keyboard 70 is also provided with a connecting section 90 joined to the casing 72, which can act to electrically connect the key switches 10 with a portable information apparatus 88 as shown in FIG. 9. The connecting section 90 is provided in the interior thereof with a connector 92 capable of being detachably connected to the portable information apparatus 88, and is disposed along one peripheral edge of the casing 72, extending between the grip sections 84 of the casing 72 and located distally from the operator. The connecting section 90 has a box-like body defining an aperture 94 through which the connector 92 is exposed. When the connector 92 is properly connected with a counterpart connector (not shown) provided in the portable information apparatus 88, the connecting section 90 securely accommodates a part of the portable information apparatus 88 through the aperture 94. As a result, the casing 72 of the keyboard 70 can detachably support the portable information apparatus 88 through the connecting section 90.

Preferably, the connecting section 90 is pivotably connected with the casing 72 through a hinge section 96 as shown in the drawings. The hinge section 96 supports the connecting section 90 pivotably about a rotation axis extending along the peripheral edge of the casing 72, and can hold the connecting section 90 statically at a desired rotation-angle position by, e.g., a known frictional structure. This structure enables an operator to perform the data-entry operation using a thumb for the respective key switches 10 as described, while grasping the grip sections 84 of the casing 72 of the keyboard 70 with his respective hands, without manually holding the portable information apparatus 88 to which the keyboard 70 is connected.

FIG. 10 shows the connecting section 90 of a preferred embodiment of the present invention in an exploded view. In this embodiment, the connecting section 90 is formed from two, lower and upper, panels 98, 100 combined with each other, and the connector 92 mounted on a circuit board 102 is securely attached to the inner face of the lower panel 98 at the substantial center thereof. Each key switch 10 incorporated in the keyboard 70 is connected with the connector 92 through a cable 104. The lower and upper panels 98, 100 are provided with a plurality of shaft-halves 106, 108, respectively, which are spaced from each other along longitudinally-extending peripheral edges of the respective panels 98, 100. When the panels 98, 100 are appropriately combined with each other, the lower shaft-halves 106 cooperate with the corresponding upper shaft-halves 108 to form a plurality of pivot shafts. The pivot shafts thus formed are pivotally joined with the respective hinge sections 96 provided along the peripheral edge of the casing 70.

Other longitudinally-extending peripheral edges 110, 112 of the lower and upper panels 98, 100 cooperate with each other to define the aperture 94 for receiving a connector section provided at one end of the portable information apparatus 88. The connector 92 is located adjacent to the peripheral edge 110 of the lower panel 98, and is configured to be connectable with the counterpart connector of the portable information apparatus 88 in a sliding manner, at substantially the same time as the insertion of a part of the portable information apparatus 88 through the aperture 94 into the connecting section 90. Levers 114 are rotatably held between the panels 98, 100 at the right and left end thereof, respectively. Each lever 114 is integrally provided with a pin 116 formed at a generally center as a rotation shaft, a pawl 118 formed at one end and a leaf spring 120 formed at the other end.

The leaf spring 120 of each lever 114 is engaged at its free end with an outer surface of the connecting section 90, so as to elastically bias the lever 114 in such a rotational direction that the pawl 118 at the other end thereof enters into the interior space of the connecting section 90 defined by the panels 98, 100. Each lever 114 is also provided adjacent to the pin 116 with an operation surface 122 exposed outside the connecting section 90. The levers 114 are usually held at positions where the pawls 118 thereof are placed in the interior space of the connecting section 90, due to biasing force generated by the leaf springs 120. In this condition, when the connector section of the portable information apparatus 88 is inserted through the aperture 94 into the connecting section 90, the pawls 118 of the levers 114 are urged outward by the body of the portable information apparatus 88, and thereby the levers 114 rotate against the biasing force of the corresponding leaf springs 120. At the instant when the connector of the portable information apparatus 88 is properly connected to the connector 92 of the connecting section 90, the pawls 118 of the levers 114 are snap-fitted into corresponding recesses (not shown) provided on the body of the portable information apparatus 88 due to the biasing force of the leaf springs 120. In this manner, the portable information apparatus 88 is electrically connected with the connector 92, and is held and engaged in an operable state where the portable information apparatus 88 is mechanically supported by the connecting section 90. The operator can detach the portable information apparatus 88 from the connecting section 90, by only pushing the operation surfaces 122 of the levers 114 against the biasing forces of the leaf springs 120, so as to disengage the pawls 118 from the portable information apparatus 88.

As described above, the keyboard 70 includes a plurality of key switches 10, each of which can effectively reduce a space required for installing the key tops 12, 14, and therefore, it is possible to facilitate the reduction in dimension and weight of the keyboard 70 without impairing the operation property of the key tops 12, 14. In this arrangement, the dimensions of the key tops 12, 14 can also be reduced, so that, even when the casing 72 is minimized, it is possible to incorporate the key tops 12, 14, the number of which is equivalent to that of the keys in a conventional keyboard incorporated in electronic equipment such as a personal computer, in an array generally the same as the array of keys in a conventional keyboard. Accordingly, the keyboard 70 makes it possible for an operator to enter letters or characters by an operation procedure substantially the same as the operation procedure for the conventional keyboard.

Moreover, the casing 72 is provided with a pair of grip sections 84, each of which is adapted to be grasped by an operator's single hand, and the key tops 12, 14 of each key switch 10 are arranged adjacent to each other about the mutual coupling region thereof in such a location as to be operable with a finger of the operator's hand grasping the grip section 84, so that, it is possible for the operator to operate the keyboard 70 while holding the keyboard 70 with his hand, in a condition where the keyboard 70 is connected with the portable information apparatus 88. Furthermore, every one of the key switches 10 can establish the home position between adjacent two keys or key tops 12, 14, due to the protrusions 42, 42 formed on the mutual coupling region of the pair of key tops 12, 14, so that, it is possible for the operator to accurately perform an entering operation without visually recognizing the key tops 12, 14 of the key switch 10 to be operated.

As the portable information apparatus 88 connectable to the keyboard 70, there are various information apparatuses, such as an electronic note, a personal digital assistant (PDA), a pen computer, a hand-held computer, and so on, which can be operated while being held by an operator's hand. Also, the keyboard according to the present invention can also be applied for a mobile telephone, such as a cellular phone or a personal handyphone system (PHS), provided that the mobile telephone is structured to be usable as an information terminal.

While the invention has been particularly shown and described with reference to preferred embodiments thereof, it will be understood by those skilled in the art that various changes and modifications may be made without departing from the spirit and scope of the following claims.

What is claimed is:

1. A key switch comprising:
   a plurality of key tops mutually and rotatably coupled with each other about a common axis in an independently movable manner; and
   a switching mechanism arranged close to said plurality of key tops and including plural sets of electric contacts, said switching mechanism capable of opening and closing any one of said plural sets of electric contacts in connection with individual movements of said key tops.

2. A key switch according to claim 1, wherein said plurality of key tops is mutually coupled through an axle at said axis so as to be rotatable relative to each other.

3. A key switch according to claim 1, wherein said plurality of key tops is provided in a mutual coupling region thereof with a supporting section for supporting said mutual coupling region against an external force.

4. A key switch according to claim 1, wherein each of said plurality of key tops is provided in a mutual coupling region thereof with a protrusion protruding outward from said key switch.

5. A key switch according to claim 1, wherein said switching mechanism includes a plurality of electrically conductive spring members for individually and elastically supporting said plurality of key tops, each of said electrically conductive spring members being elastically deformed in accordance with a pressing operation of each key top so as to close one of said plural sets of electric contacts.

6. The key switch according to claim 1, wherein said plurality of key tops is two.

7. The key switch according to claim 6, wherein each of said plural sets of electric contacts is two pairs of electrical contacts.

8. The key switch according to claim 1, wherein said plurality of key tops is three.

9. The key switch according to claim 8, wherein each of said plural sets of electrical contacts is three pairs of electrical contacts.

10. A keyboard comprising a plurality of key switches, each of said key switches being as defined in claim 1.

11. A keyboard according to claim 10, further comprising a casing for accommodating said plurality of key switches with said plurality of key tops being at least partially exposed, and a connecting section joined to said casing and capable of electrically connecting said plurality of key switches with a portable information apparatus, wherein said casing is capable of detachably supporting said portable information apparatus through said connecting section.

12. A keyboard according to claim 11, wherein said casing includes a pair of grip sections, each grip section being usable for a single hand grasping.

13. A keyboard according to claim 12, wherein said grip sections are arranged at opposite end regions of said casing, wherein said plurality of key switches is accommodated in said casing so as to dispose said plurality of key tops of said key switches in an array between said grip sections, and wherein said key tops of each key switch are arranged adjacent to each other about a mutual coupling region thereof, in such a manner as to present either one of two different orientations defined in opposite areas of a virtual bisector located between said grip sections on said casing.

14. A keyboard according to claim 13, wherein said key tops of said plurality of key switches are disposed symmetrically with respect to said virtual bisector on said casing.

15. A keyboard comprising:
   a casing including at least one grip section usable for a single hand grasping; and
   a plurality of key switches accommodated in said casing, each of said key switches including a plurality of key tops which are mutually and rotatably coupled with each other about a common axis in an independently movable manner and are at least partially exposed from said casing, and a switching mechanism arranged close to said plurality of key tops in said casing and including plural sets of electric contacts, said switching mechanism capable of opening and closing any one of said plural sets of electric contacts in connection with individual movements of said key tops;
   wherein said plurality of key tops of each key switch are arranged adjacent to each other about a mutual coupling region thereof, at positions allowing a finger operation by a hand grasping said at least one grip section.

16. A keyboard according to claim 15, wherein said plurality of key tops of each key switch is mutually coupled through an axle at said axis so as to be rotatable relative to each other.

17. A keyboard according to claim 15, wherein said plurality of key tops of each key switch is provided in said mutual coupling region with a supporting section for supporting said mutual coupling region against an external pressing force.

18. A keyboard according to claim 15, wherein said plurality of key tops of each key switch is provided in said mutual coupling region with a protrusion protruding outward from said key switch for allowing finger tactile recognition of said key switch.

19. A keyboard according to claim 15, wherein said at least one grip section is two grip sections, each arranged at opposite end regions of said casing, and wherein said plurality of key tops of said plurality of key switches is disposed symmetrically with respect to a virtual bisector located between said grip sections on said casing.

20. A keyboard according to claim 15, further comprising a connecting section joined to said casing and capable of electrically connecting said plurality of key switches with a portable information apparatus, wherein said casing is capable of detachably supporting said portable information apparatus through said connecting section.

21. The keyboard according to claim 15, wherein said plurality of key tops is two.

22. The keyboard according to claim 21, wherein each of said plural sets of electric contacts is two pairs of electrical contacts.

23. The keyboard according to claim 15, wherein said plurality of key tops is three.

24. The key switch according to claim 23, wherein each of said plural sets of electrical contacts is three pairs of electrical contacts.

* * * * *